Figure 1:
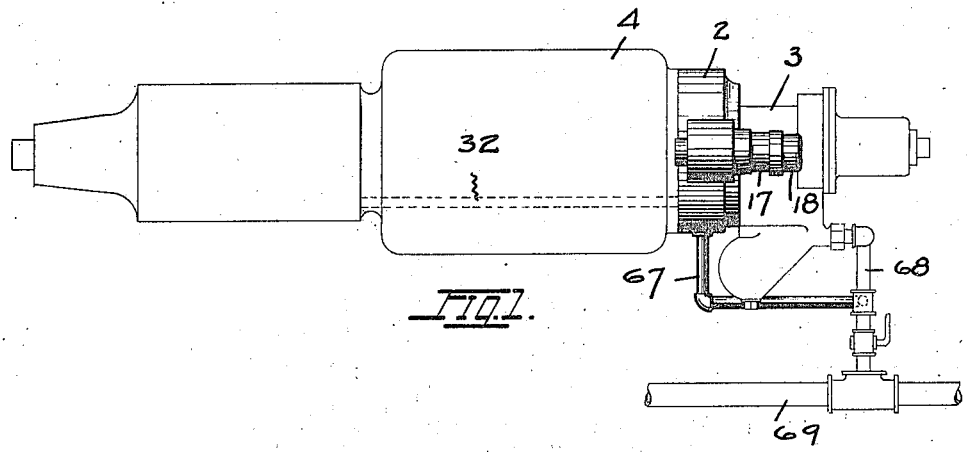

Mar. 13, 1923.

T. J. STEINKELLER
PRESSURE CONTROL VALVE
Filed Nov. 10, 1920

1,448,469

3 sheets-sheet 1

WITNESS
H. Sherburne

INVENTOR
Thomas J. Steinkeller
BY
White Prost & Evans
his ATTORNEYS

Mar. 13, 1923.
T. J. STEINKELLER
PRESSURE CONTROL VALVE
Filed Nov. 10, 1920
1,448,469
3 sheets-sheet 2
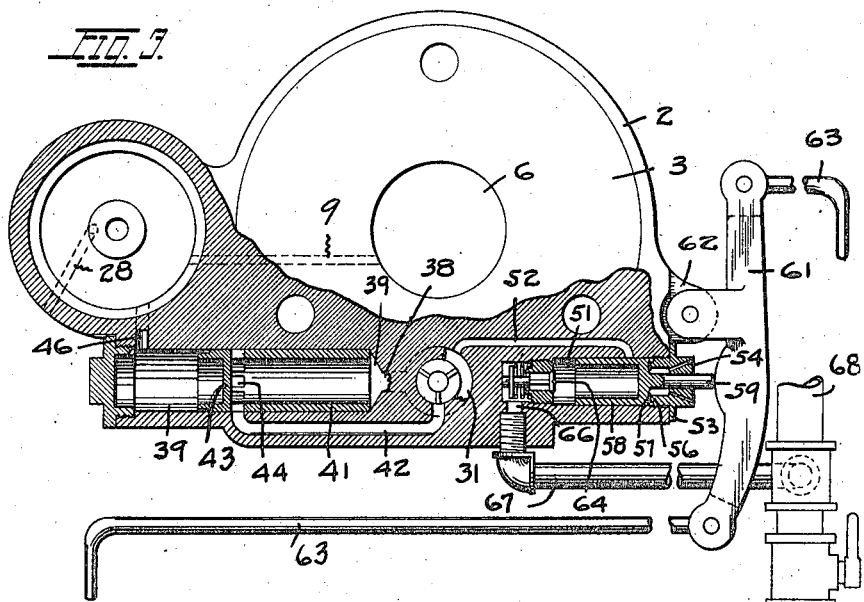
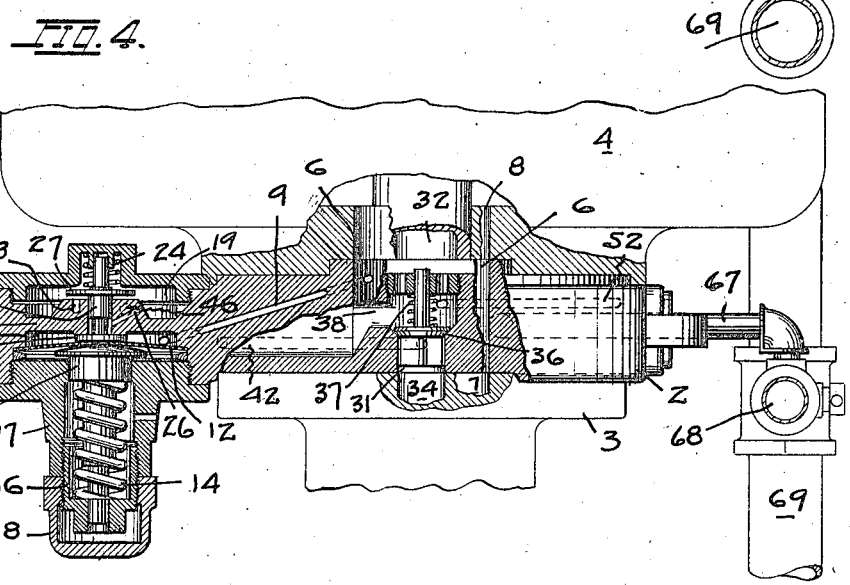
WITNESS
INVENTOR
Thomas J. Steinkeller
his ATTORNEYS

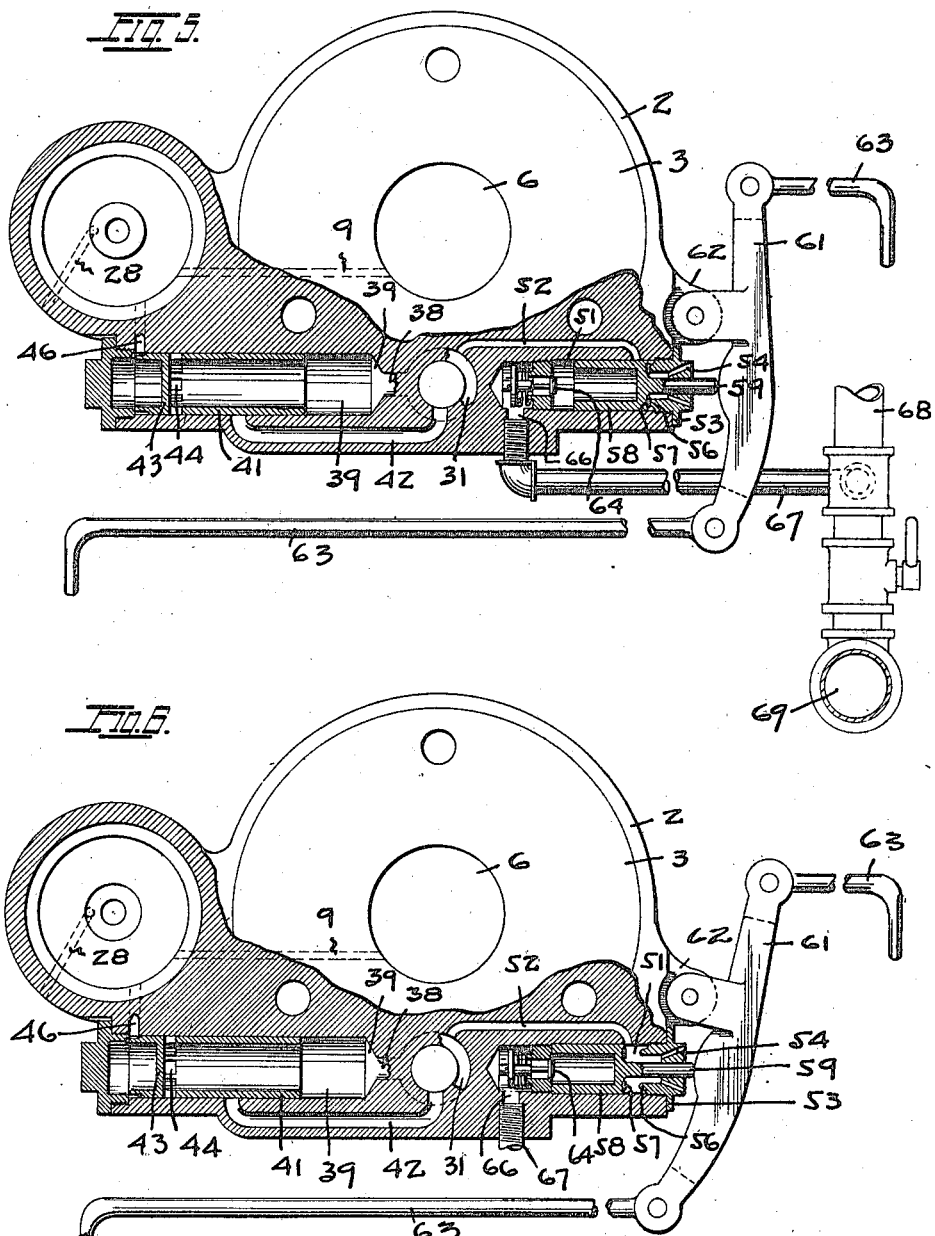

Patented Mar. 13, 1923.

1,448,469

UNITED STATES PATENT OFFICE.

THOMAS J. STEINKELLER, OF BERKELEY, CALIFORNIA.

PRESSURE-CONTROL VALVE.

Application filed November 10, 1920. Serial No. 423,056.

*To all whom it may concern:*

Be it known that I, THOMAS J. STEINKELLER, a citizen of the United States, and a resident of Berkeley, county of Alameda, and State of California, have invented a new and useful Pressure-Control Valve, of which the following is a specification.

My invention relates to air brake apparatus.

The principal object of the invention is to provide a valve for automatically controlling the pressure in the brake cylinder of an air brake system, so that the pressure in the brake cylinder during the operation of the train cannot fall below a predetermined safe pressure. With the standard air brake equipment now in use, the air in the auxiliary reservoir which is normally maintained at a pressure of 70 to 90 pounds is the entire pressure available for controlling the brakes of the train, except as the auxiliary reservoir pressure is increased or the reservoir fully recharged during permissible or safe releasing of the brakes. Since the auxiliary reservoir cannot be recharged in normal operation except when the brakes are off or releasing, it follows that extraordinary precautions by the engineer are necessary to see that the auxiliary reservoir is fully charged at the top of every grade, and that every opportunity is taken advantage of on level stretches and curves to release the brakes and recharge the reservoir as fully as possible to maximum pressure. Only by exercising the greatest of care, can the skillful engineer so conserve the auxiliary reservoir pressure as to retain control of his train and avoid disaster. On long and difficult grades, manually operated retaining valves are used, the brakemen setting up the retaining valve on each car as needed. My present invention comprises an automatic retaining valve. Assuming that 50 pounds is a safe pressure that is, sufficient fully to control the train, my valve, for pressure above that amount, is inactive; the triple valve operating in the usual way to admit and discharge air to and from the brake cylinder in accordance with variations of pressure in the train line effected by the engine driver. When the pressure in the auxiliary reservoir falls to 50 pounds my valve functions to prevent further reduction and to trap the air at that pressure in the brake cylinder. The brakes are then held on with 50 pounds pressure, and cannot be released until the auxiliary reservoir pressure has risen above that amount. With the brakes so held, the engineer may recharge the auxiliaries without permitting acceleration of the train speed; or, if for any reason the auxiliaries cannot be recharged, a full stop is forced, so that the trouble can be located and remedied. Primarily then my valve is a safety appliance of the first magnitude, since it eliminates any possibility of loss of control of the train irrespective of the engineer's handling of the air.

About 15% of the steam generated in the boiler of the locomotive is used by the air pump, and it will be readily appreciated that the conservation of the air effected by my valve is readily expressed in terms of fuel saved. Thus, secondarily, my valve is a measure of economy, and this is true, not only on account of the substantial quantities of fuel saved, but because its use renders unnecessary certain other apparatus, such as retainer valves, and the emergency reservoirs and related mechanism found necessary on passenger equipment.

Another object of the invention is to provide a device of the character described including a bleed valve which is manually opened to discharge the brake cylinder, but which is automatically closed when the air is turned into the train line to charge the auxiliaries.

Another object of the invention is to provide a device comprising automatic retainer and bleed valves included within a housing of such character that it may readily be interposed in standard equipment between the triple valve and the auxiliary reservoir, without material changes and at little expense.

The invention possesses other objects and features of advantage some of which, with the foregoing, will be set forth in the following description of the preferred form of my invention which is illustrated in the drawings accompanying and forming part of the specification. It is understood that I do not limit myself to the showing made by the said drawings and description, as I may adopt variations of the preferred form within the scope of my invention as set forth in the claims.

Referring to the drawings:

Figure 1 is a side elevation of the group of air brake apparatus with which my valve is assembled and directly associated. Fig.

Figure 2:
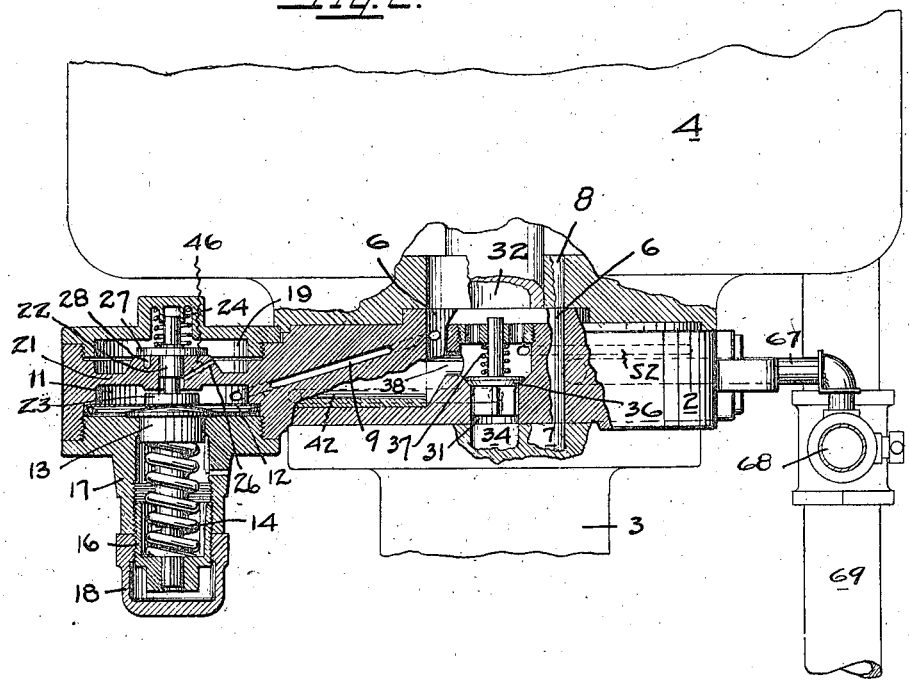

2 is a plan view largely in section showing my valve and portions of the auxiliary reservoir and triple valve. Fig. 3 is an elevation of my valve, largely in section. Figs. 2 and 3 show the parts in the position assumed when the auxiliary reservoir pressure is in excess of the safe pressure. Figs. 4 and 5 are similar to Figs. 2 and 3 respectively, but show the parts in the position assumed when the auxiliary reservoir pressure has fallen to 50 pounds. Fig. 6 is a view similar to Figs. 3 and 5 but showing the parts during a bleeding of the brake cylinder.

My pressure control valve comprises a housing 2 so formed as to adapt it for insertion between the triple valve 3 and the auxiliary reservoir 4 of standard air brake equipment. A passage 6 in the housing alined with passages 7 and 8 in the triple valve and auxiliary reservoir respectively preserves communication between the two. Connected with this passage by passage 9 is a pressure chamber 11, of which one side is formed by the flexible diaphragm 12. The diaphragm is thus subjected at all times to auxiliary reservoir pressure. On the opposite side of the diaphragm and opposing the auxiliary reservoir pressure is a stud 13 pressed against the diaphragm by the coil spring 14. The tension of the spring is regulated by the cup nut 16 which also provides a bearing for the stud, and which is threaded into the annular casing 17 which surrounds the stud and spring. A cap 18 closes the casing and provides a lock nut for the cup nut.

Separating the pressure chamber from the chamber 19 is the wall 21 in which is arranged a valve stem 22 having a head 23 pressed against the diaphragm by the spring 24. The valve 23 controls the passage 26 connecting the chambers 11 and 19. On the same valve stem is a valve head 27 for controlling passage 28 which connects chamber 19 with the open air. The spring 24 tends to hold the valve 23 open and the valve 27 closed, but with movement of the diaphragm under the influence of the spring 14, the valve 23 closes and the valve 27 opens as shown in Fig. 4. The tension on the spring 14 is such that the stud 13 is held on the seat by pressure in the pressure chamber 11, in excess of a safe auxiliary reservoir pressure which for example may be assumed to be 50 pounds. That is, so long as the auxiliary reservoir pressure is above 50 pounds, the diaphragm presses against the stud, and the valve 23 is held open and the valve 27 closed by the spring 24, all as shown in Fig. 2. With a lessening of auxiliary reservoir pressure to 50 pounds, the diaphragm pressure is overbalanced by the pressure of the spring 14, and the valve 23 is closed and the valve 27 opened, as shown in Fig. 4. Thus, it is seen that the position of the double valve 23—27 and the closed or open condition of the passages 26 and 28 are determined by the auxiliary reservoir pressure.

Formed in the housing 2 to one side of the central passage 6 is a passage 31 alined with and connecting the passage 32 in the brake cylinder pipe leading to the brake cylinder 33 with the passage 34 in the triple valve. A valve 36, normally closed by spring 37 is arranged in the passage 31 to permit air from the triple valve to flow to the brake cylinder, but to prevent the return flow to the triple valve thru the passage 31.

On the reservoir side of the valve 36, the passage 31 is connected by passage 38 with the cylindrical chamber 39, in which the piston valve 41 is slidably disposed. On the triple valve side of the valve 36, the passage 31 is connected by passage 42 with the chamber 39. The piston valve comprises a light cylindrical shell formed with the partition wall 43. The wall of the piston valve is formed with a series of circumferentially arranged apertures 44, one of which will register with the opening into the passage 42 when the piston valve is in its extreme position at the right as shown in Fig. 3, thus providing a by-pass around the valve 36. The cross section of the passage 42 is less than that of passage 38 so that in the passage of air thru the by-pass, a pressure builds up in the chamber 39, tending to move the piston valve to the left to close the passage 42, as shown in Fig. 5. On the opposite side of the piston valve, the chamber 39 is connected by passage 46 with the chamber 19.

From the above it will be clear that so long as the auxiliary reservoir pressure exceeds the minimum safe pressure of, say 50 pounds, the stud 13 is held on its seat by the diaphragm 12, and the valve 23 is open to permit the air under auxiliary reservoir pressure to pass into chamber 19, and thence thru passage 46 to chamber 39, pressing the piston valve to its extreme position against the far wall of the chamber as shown in Fig. 3. In this position the by-pass about the valve 36 thru passage 42 is open, and the triple valve is free to function in the usual way. Upon reduction in the train line pressure, air from the auxiliary reservoir passes thru the triple valve into passage 31, past valve 36, then into passage 32 and thence to the brake cylinder. Upon increase in the train line pressure, the air in the brake cylinder returns to the triple valve thru the by-pass 42 and is exhausted into the air, the by-pass being kept open by the superior auxiliary reservoir pressure exerted against the left side (Fig. 3) of the piston valve. If however, thru successive reductions in the train line pressure, the pressure in the auxiliary reservoir falls to the lower limit of safe pressures, (assumed to be 50 pounds) the lowered pressure on the diaphragm permits the spring 14 to close valve 23 and open valve 27. The air in chamber 19 and the connected portion of chamber 39 then exhausts into the air thru passage 28, releasing all pressure against the left side of the piston valve. Since the passage 42 is of less capacity than the passage 38, the piston valve will immediately move to the left, covering passage 42, and preventing further escape of air from the brake cylinder, such pressure remaining at substantially 50 pounds, the brakes being held on with that pressure. The parts are now as shown in Fig. 5. This will bring the train to a stop unless the brake cylinder pressure is released, but a release can take place only by a movement of the piston valve to the right so as to reestablish the by-pass connection to the triple valve. This occurs when the diaphragm is moved to permit the valve 23 to open and the valve 27 to close, by augmentation of the auxiliary reservoir pressure to a point in excess of the minimum safe pressure.

It is therefore not within the power of the engineer to fritter away his air until the auxiliary pressure available is insufficient to control his train. The personal equasion is removed, and a safe pressure sufficient for the full control of the train is insured, or the train is automatically stopped to compel attention.

When the cars of a train are separated for any cause, the brakes are automatically set, and before any subsequent movement of the cars can take place, the brakes must be released by exhausting or bleeding the air from the brake cylinder and auxiliary reservoir. It has been customary therefore to place a bleeder valve on each auxiliary reservoir to be opened and held open by one of the train crew until the air was exhausted sufficiently to permit the brakes to be released. In my present pressure control valve, I include a bleed valve adapted to be quickly opened by a brakeman as he passes rapidly along the side of the train. The valve then remains open to permit the air to exhaust from the brake cylinder and auxiliary reservoir. When the cars are again made up into trains, the rise of pressure in the train line effects the automatic closing of each bleed valve, so that the auxiliaries may be recharged. Thus a very large saving in time and labor is accomplished, and added safety and efficiency secured.

Formed in the housing 2 is a cylindrical chamber 51, connected near one end (right of Fig. 3) with passage 31 by the passage 52. The end of the chamber 51 is closed by the screw plug 53, thru which passages 54 extend so that the end of the chamber is in communication with the open air. The end of the plug is provided with an annular flange 56 forming a valve seat adapted to be engaged by the annular gasket 57 disposed on the end of the piston valve 58 which forms a rather loose sliding fit in the chamber 51. A stem 59 on the piston valve extends thru the plug 53 and is adapted to be engaged by the lever 61 pivoted on the lug 62 extending from the housing 2. Links 63 pivoted to the opposite ends of the lever extend to the sides of the car and provide readily accessible handles with which the bleed valve may be opened.

At the inner end of the chamber a spring pressed check valve 64 is arranged to control the flow of air thru the passage 66, connecting the chamber 51 with the conduit 67, which opens into the branch line 68. Air may thus pass from the train line 69 thru conduit 67, passage 66 and past the valve into the chamber 51, but cannot flow from the chamber into the passage 66. The special function of the check valve is to prevent the undesired movement of the piston valve 58 with a reduction in train line pressure.

Normally the bleed valve parts are as shown in Fig. 3, the piston valve 58 covering the passage 52 and tightly seated on the flange 56 to prevent leakage thru passages 54. The valve 58 is normally held in this position by the pressure in the chamber 51, which is obviously that of the train line. Leakage past the valve 58 escapes into passage 52 in which the pressure is that of the auxiliary reservoir.

When it is desired to bleed the brakes, one of the links 63 is pulled out, thus pushing in the piston valve and, as shown in Fig. 6, uncovering the passage 52, so that the air from the brake cylinder may exhaust into the end of the chamber 51 and escape thru passages 54 into the open air. Air from the auxiliary reservoir also passes the valve 36 and escapes thru the same passage. Since there is no pressure in the train line the valve 58 remains in the open position when pushed there by the pull on the link 63, and a brakeman can therefore pass rapidly along a string of cars, opening the bleed valves as he goes. With the opening of the bleed valve the air is soon exhausted from the brake cylinder and auxiliary reservoir and the brakes released. No further attention need be given the bleed valve, the single pull on the link being sufficient.

When the car is again coupled into a train, and air is pumped into the train line to recharge the auxiliaries, the valve 64 opens and the piston valve 58 is forced upon its seat, sealing the escape passages 54 and covering the passage 52.

I claim:

1. An automatic retainer valve for air brake apparatus comprising a housing formed with a passage for connecting the triple valve to the brake cylinder, a check valve in said passage, said housing being formed with a by-pass about said check valve, a valve for controlling the flow of air thru said by-pass, and means for opening said by-pass valve when the pressure in the auxiliary reservoir exceeds a predetermined amount.

2. An automatic retainer valve for air brake apparatus comprising a housing formed with a passage for connecting the triple valve to the brake cylinder, a check valve in said passage, said housing being formed with a by-pass about said check valve, a valve for controlling the flow of air thru said by-pass, and means operated by auxiliary reservoir air under pressure exceeding a predetermined minimum for applying said air to open said by-pass valve.

3. An automatic retainer valve for air brake apparatus comprising a housing formed with a passage for connecting the triple valve to the brake cylinder, a check valve in said passage, said housing being formed with a by-pass about said check valve, and means operable by auxiliary reservoir air under pressure exceeding a predetermined minimum for opening said by-pass and by air from the brake cylinder for closing said by-pass when the pressure in the auxiliary reservoir falls to said predetermined minimum.

4. An automatic retainer valve for air brake apparatus comprising a housing formed with a passage for connecting the triple valve to the brake cylinder, a check valve in said passage, said housing being formed with a by-pass about said check valve, and a valve for controlling the flow of air thru said by-pass and movable to close the by-pass by the air therein when the pressure in the auxiliary reservoir falls to a predetermined minimum.

5. An automatic retainer valve for air brake apparatus comprising a housing formed with a passage for connecting the triple valve to the brake cylinder, a check valve in said passage, said housing being formed with a by-pass about said check valve, a valve for controlling the flow of air thru said by-pass and movable to close the by-pass by the air therein, and means for applying to said by-pass valve air from the auxiliary reservoir when the pressure therein exceeds a predetermined minimum for holding said by-pass valve open.

6. An automatic retainer valve for air brake apparatus comprising a housing formed with a passage for connecting the triple valve to the brake cylinder, a check valve in said passage, said housing being formed with a by-pass about said check valve, a piston valve for controlling the flow of air thru said by-pass and movable by the pressure of the air in the by-pass against one side thereof to close the by-pass, said housing being formed with a passage for connecting the auxiliary reservoir with the piston valve chamber whereby air from the auxiliary reservoir opposes the closing movement of said piston valve, and means for closing said last named passage and permitting said opposing air to exhaust when the pressure in the auxiliary reservoir falls to a predetermined minimum.

7. An automatic retainer valve for air brake apparatus comprising a housing formed with a passage for connecting the triple valve to the brake cylinder, a check valve in said passage, said housing being formed with a by-pass about said check valve comprising a valve chamber connected into said passage on the auxiliary reservoir side of said check valve by a large channel and connected into said passage on the triple valve side of said check valve by a smaller channel, a piston valve in said valve chamber said housing being formed with a passage for connecting the end of said chamber on the side of said piston valve opposite to said large channel with said auxiliary reservoir, and means for closing said last named passage and permitting the air in said valve chamber admitted therethrough to exhaust when the pressure in the auxiliary reservoir falls to a predetermined minimum.

8. An automatic retainer valve for air brake apparatus comprising a housing formed with a passage for connecting the triple valve to the brake cylinder, a check valve in said passage, said housing being formed with a by-pass about said check valve comprising a valve chamber connected into said passage on the auxiliary reservoir side of said check valve by a large channel and connected into said passage on the triple valve side of said check valve by a smaller channel, a piston valve in said valve chamber, said housing being formed with a passage for connecting the end of said chamber on the side of said piston valve opposite to said large channel with said auxiliary reservoir, a normally open valve in said last named passage, a diaphragm engaging said normally open valve and exposed on one side to the pressure of the auxiliary reservoir, and a spring on the opposite side of said diaphragm for moving it to close said normally open valve when the pressure in the auxiliary reservoir falls to a predetermined minimum.

9. An automatic retainer valve for air brake apparatus comprising a housing formed with a passage for connecting the triple valve to the brake cylinder, a check valve in said passage, said housing being formed with a by-pass about said check valve comprising a valve chamber connected into said passage on the auxiliary reservoir side of said check valve by a large channel and connected into said passage on the triple valve side of said check valve by a smaller channel, a piston valve in said valve chamber, said housing being formed with a passage for connecting the end of said chamber on the side of said piston valve opposite to said large channel with said auxiliary reservoir, a normally open valve in said last named passage, a diaphragm engaging said normally open valve and exposed on one side to the pressure of the auxiliary reservoir, a spring on the opposite side of said diaphragm for moving it to close said normally open valve when the pressure in the auxiliary reservoir falls to a predetermined minimum, and means for varying the tension on said spring.

10. An automatic retainer valve for air brake apparatus comprising a housing formed with a passage for connecting the triple valve to the brake cylinder, a check valve in said passage, said housing being formed with a by-pass about said check valve, a valve for controlling the flow of air through said by-pass and movable to close the by-pass by the pressure of air therein against one side of the by-pass valve, said housing being formed with a passage for admitting air from the auxiliary reservoir to the opposite side of said valve and with a vent passage from said opposite side to the open air, a normally open valve for controlling the auxiliary reservoir passage, a normally closed valve for controlling the vent passage, a light spring for moving said last named valves to open the auxiliary reservoir passage and close the vent passage, a heavier spring for moving said last named valves to close the auxiliary reservoir passage and open the vent passage, and a diaphragm exposed to the auxiliary reservoir pressure opposing the action of said heavier spring.

11. An automatic retainer valve for air brake apparatus comprising a housing adapted to be interposed between the triple valve and the auxiliary reservoir and formed with a passage connecting the triple valve with the auxiliary reservoir and a second passage connecting the triple valve to the brake cylinder pipe, a check valve in said second passage, said housing being formed with a by-pass about said check valve, a valve for controlling the flow of air through said by-pass, and means for opening said by-pass valve when the pressure in the auxiliary reservoir exceeds a predetermined amount.

12. An automatic retainer valve for air brake apparatus comprising a housing adapted to be interposed between the triple valve and the auxiliary reservoir and formed with a passage connecting the triple valve with the auxiliary reservoir and a second passage connecting the triple valve to the brake cylinder pipe, a check valve in said second passage, said housing being formed with a by-pass about said check valve, a valve for controlling the flow of air through said by-pass and movable to close the by-pass by the air therein, said housing being formed with a passage for admitting air from the auxiliary reservoir to the opposite side of said valve to oppose said closing movement, and means for closing said last named passage and permitting said opposing air to exhaust when the pressure in the auxiliary reservoir falls to a predetermined minimum.

13. A pressure control valve for air brake apparatus, comprising a housing adapted to be interposed between the auxiliary reservoir and the triple valve and formed with passages for connecting the triple valve with the brake cylinder pipe and the triple valve with the auxiliary reservoir, means in said housing for closing one of said passages against the return flow of air from the brake cylinder to the triple valve, and means in said housing operative by the air in the auxiliary reservoir when the pressure therein exceeds a predetermined amount for opening the closed passage.

14. A pressure control valve for air brake apparatus, comprising a housing adapted to be interposed between the auxiliary reservoir and the triple valve and formed with passages for connecting the triple valve with the brake cylinder pipe and the triple valve with the auxiliary reservoir, and means comprising an automatically operated retaining valve arranged in said housing.

15. A pressure control valve for air brake apparatus, comprising a housing adapted to be interposed between the auxiliary reservoir and the triple valve and formed with passages for connecting the triple valve with the brake cylinder pipe and the triple valve with the auxiliary reservoir, means comprising a retaining valve automatically operated when the auxiliary reservoir pressure falls to a predetermined amount arranged in said housing, and means comprising an automatically closed bleed valve arranged in said housing.

16. A pressure control valve for air brake apparatus comprising a housing adapted to be interposed between the triple valve and the auxiliary reservoir and formed with a passage connecting the triple valve with the auxiliary reservoir and a second passage connecting the triple valve to the brake cylinder pipe, a check valve in said second passage, said housing being formed with a by-pass about said check valve, a valve for controlling the flow of air thru said by-pass, means for opening said by-pass valve when the pressure in the auxiliary reservoir exceeds a predetermined amount, and a bleed valve arranged in said housing and connected into said second passage between said check valve and said brake cylinder pipe.

17. A pressure control valve for air brake apparatus comprising a housing adapted to be interposed between the triple valve and the auxiliary reservoir and formed with a passage connecting the triple valve with the auxiliary reservoir and a second passage connecting the triple valve to the brake cylinder pipe, a check valve in said second passage, said housing being formed with a by-pass about said check valve, a valve for controlling the flow of air thru said by-pass, means for opening said by-pass valve when the pressure in the auxiliary reservoir exceeds a predetermined amount, said housing being formed with a bleed valve chamber and an exhaust passage connecting said chamber with said second passage between said check valve and said brake cylinder pipe, a vent passage for said chamber, means connecting the chamber with the train line, a check valve for controlling the flow of train line air thru said means, a valve in said chamber movable by said train line air to cover said exhaust passage, and manually operated means for moving said chamber valve to uncover said exhaust passage and said vent passage.

18. A pressure control valve for air brake apparatus, comprising a housing adapted to be interposed between the auxiliary reservoir and the triple valve and formed with passages for connecting the triple valve with the brake cylinder pipe and the triple valve with the auxiliary reservoir, and a retaining valve and a bleed valve arranged in said housing.

19. An automatic retainer valve for air brake apparatus comprising a normally open valve for controlling the flow of air from the brake cylinder, and means controlled by the air under pressure in the auxiliary reservoir for permitting the closing of said valve.

20. An automatic retainer valve for air brake apparatus comprising a valve for controlling the flow of air from the brake cylinder and movable to closed position by the air in said brake cylinder, and means for applying air from the auxiliary reservoir to said valve when the pressure in the auxiliary reservoir exceeds a predetermined amount to hold said valve in open position.

In testimony whereof I have hereunto set my hand.

THOMAS J. STEINKELLER